(12) United States Patent
Sharma et al.

(10) Patent No.: US 10,922,075 B2
(45) Date of Patent: Feb. 16, 2021

(54) SYSTEM AND METHOD FOR CREATING AND VALIDATING SOFTWARE DEVELOPMENT LIFE CYCLE (SDLC) DIGITAL ARTIFACTS

(71) Applicant: MORGAN STANLEY SERVICES GROUP, INC., New York, NY (US)

(72) Inventors: Girish C. Sharma, Pennington, NJ (US); Alberto Cira, Tlaquepaque (MX)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 16/380,008

(22) Filed: Apr. 10, 2019

(65) Prior Publication Data
US 2020/0326932 A1 Oct. 15, 2020

(51) Int. Cl.
*G06F 8/71* (2018.01)
*G06F 8/33* (2018.01)
*G06F 8/10* (2018.01)

(52) U.S. Cl.
CPC .............. *G06F 8/71* (2013.01); *G06F 8/10* (2013.01); *G06F 8/33* (2013.01)

(58) Field of Classification Search
CPC ..... G06F 8/10; G06F 8/33; G06F 8/70; G06F 8/71; G06F 8/73; G06F 11/3664–3696; G06F 9/453
USPC .................................. 717/120, 121, 123–125
See application file for complete search history.

(56) References Cited

U.S. PATENT DOCUMENTS

| | | | |
|---|---|---|---|
| 5,987,251 A * | 11/1999 | Crockett | G06F 8/73 717/115 |
| 7,761,844 B2 | 7/2010 | Bove et al. | |
| 8,024,703 B2 | 9/2011 | Gerken et al. | |
| 8,418,126 B2 | 4/2013 | Chaar et al. | |
| 9,274,783 B2 * | 3/2016 | Valkov | G06F 8/65 |
| 10,095,511 B1 | 10/2018 | Sengupta et al. | |
| 10,108,414 B2 * | 10/2018 | Akbulut | G06F 8/70 |
| 10,860,458 B2 * | 12/2020 | Shani | G06F 11/3612 |
| 2008/0256506 A1 | 10/2008 | Chaar et al. | |
| 2009/0171705 A1 | 7/2009 | Bobak et al. | |

(Continued)

OTHER PUBLICATIONS

Baysal, O., et al., Extracting Artifact Lifecycle Models from Metadata History, 1st International Workshop on Data Analysis Patterns in Software Engineering (DAPSE), May 21-21, 2013, pp. 17-19, [retrieved on Dec. 26, 2020], Retrieved from the Internet: <URL:http://ieeexplore.ieee.org/>.*

(Continued)

*Primary Examiner* — Geoffrey R St Leger
(74) *Attorney, Agent, or Firm* — Weitzman Law Offices, LLC

(57) ABSTRACT

Systems and methods for creating and validating software development life cycle ("SDLC") digital artifacts are disclosed. In an embodiment, a computer-implemented system includes a processor that is configured to determine whether a template of an SDLC artifact is valid, and in response to a determination that the template of the SDLC artifact is valid, to map one or more properties to the template. In an embodiment, the processor is configured to associate software asset metadata and one or more approvers of the SDLC artifact, and to transform the SDLC artifact into a standard-compliant SDLC artifact.

20 Claims, 6 Drawing Sheets

(56) References Cited

U.S. PATENT DOCUMENTS

| | | | | |
|---|---|---|---|---|
| 2011/0004499 | A1* | 1/2011 | Zhang | G06F 8/10 |
| | | | | 705/7.37 |
| 2011/0314439 | A1* | 12/2011 | Colgrave | G06Q 10/06 |
| | | | | 717/101 |
| 2013/0268913 | A1 | 10/2013 | Anderson et al. | |
| 2015/0178065 | A1* | 6/2015 | Valkov | G06F 16/93 |
| | | | | 717/169 |
| 2015/0199184 | A1 | 7/2015 | Doddavula et al. | |
| 2016/0103676 | A1* | 4/2016 | Akbulut | G06F 8/65 |
| | | | | 717/101 |
| 2016/0132328 | A1 | 5/2016 | Bouley et al. | |
| 2017/0039492 | A1 | 2/2017 | Henke et al. | |
| 2017/0091072 | A1* | 3/2017 | Atyam | G06F 8/65 |
| 2017/0161057 | A1 | 6/2017 | Khazanchi et al. | |
| 2017/0163518 | A1 | 6/2017 | Dube et al. | |
| 2018/0060066 | A1 | 3/2018 | Rihani et al. | |

OTHER PUBLICATIONS

Kläs, M., et al., Predicting Defect Content and Quality Assurance Effectiveness by Combining Expert Judgment and Defect Data—A Case Study, 19th International Symposium on Software Reliability Engineering, 2008, pp. 17-26, [retrieved on Dec. 26, 2020], Retrieved from the Internet: <URL:http://ieeexplore.ieee.org/>.*

* cited by examiner

SYSTEM AND METHOD FOR CREATING AND VALIDATING SOFTWARE DEVELOPMENT LIFE CYCLE (SDLC) DIGITAL ARTIFACTS

FIELD OF THE INVENTION

The present invention relates generally to digital artifacts, and more particularly, to software development life cycle ("SDLC") digital artifacts.

BACKGROUND

Conventional SDLC documentation practices may have a number of drawbacks. For example, standard formats may not be followed when documents are created. In some situations, one or more sections in the artifacts may be missing. In addition, the artifacts may be stored on separate servers at multiple locations. The artifacts may be out of synchronization with development changes when the software that utilizes these artifacts is updated. In conventional SDLC practices where validation of artifacts is not provided consistently, design documents created by users may not follow a standard software architecture, network topology, database schema, class or Unified Modeling Language ("UML") diagram format, and may not adhere to common infrastructure, design, deployment or testing guidelines for compliance with established standards.

Due to the lack of standardization and consistency in validation of artifacts, different tools or design documents may be required for implementing such artifacts, thereby consuming valuable processing time and resources. In some instances, design documents or guidelines may be distributed widely through emails or other means of communications, and a standard template version may not be followed consistently. It may be difficult to locate the correct or most up-to-date version of the artifacts, different versions of which may be spread across various servers, sites, or emails. It may take a great amount of time and human resources to investigate and resolve issues arising from using incorrect or out-of-date artifacts.

Accordingly, there is a need for an improved system and method for creation and validation of SDLC artifacts.

SUMMARY

Systems and methods for creating and validating SDLC digital artifacts are disclosed herein.

According to an embodiment, a computer-implemented system comprises: a memory; and a processor coupled to the memory, the processor configured to: receive an SDLC artifact that includes a template created on a user interface (UI) without coding, wherein the UI is configured to represent one or more requirements of the SDLC artifact based upon one or more rules indicating one or more tiers of approval; determine whether the template of the SDLC artifact is valid; map one or more properties to the template in response a determination that the template of the SDLC artifact is valid; associate software asset metadata and one or more approvers of the SDLC artifact based upon the one or more tiers of approval; and transform the SDLC artifact into a standard-compliant SDLC artifact.

According to another embodiment, a computer-implemented method comprises: receiving an SDLC artifact that includes a template created on a user interface (UI) without coding, wherein the UI is configured to represent one or more requirements of the SDLC artifact based upon one or more rules indicating one or more tiers of approval; determining whether the template of the SDLC artifact is valid; mapping one or more properties to the template in response to a determination that the template of the SDLC artifact is valid based upon the one or more tiers of approval; associating software asset metadata and one or more approvers of the SDLC artifact; and transforming the SDLC artifact into a standard-compliant SDLC artifact.

BRIEF DESCRIPTION OF THE DRAWINGS

In order to facilitate a fuller understanding of the invention, reference is made to the attached drawings. The drawings should not be construed as limiting the invention, but are intended only to illustrate different aspects and embodiments of the invention.

DETAILED DESCRIPTION

Exemplary embodiments of the invention will be described in order to illustrate various features of the invention. The embodiments described herein are not intended to be limiting as to the scope of the invention, but rather are intended to provide examples of the components, use, and operation of the invention.

Figure 1:
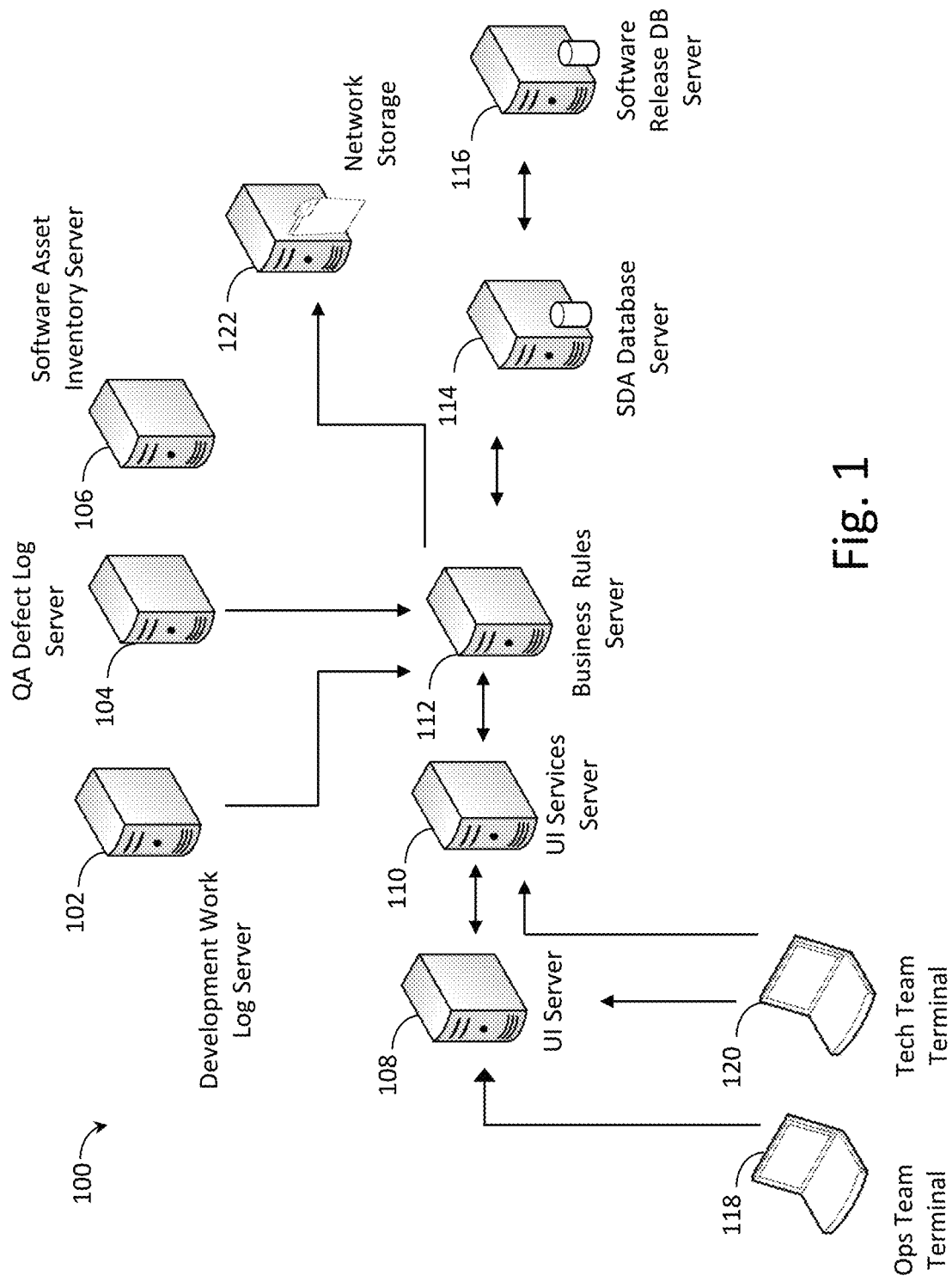
FIG. 1 illustrates an example of a block diagram of a computer network according to an exemplary embodiment of the invention.

An embodiment of a computer network 100 is shown in FIG. 1. The computer network 100 may include a developer work log server 102, a quality assurance (QA) defect log server 104, a software asset inventory server 106, a user interface (UI) server 108, a UI services server 110, a business rules server 112, an SDLC Digital Artifact ("SDA") database server 114, and a software release database server 116. Although these servers are shown in FIG. 1 as separate servers, any two or more of these servers may be integrated into a single computer or processing platform in a computer network. In the embodiment shown in FIG. 1, the computer network 100 also may include an operations team terminal 118, a technical team terminal 120, and a network storage 122. One or more additional terminals may be provided in the computer network 100. Likewise, one or more additional network storages may be provided at a single location or at multiple locations in the computer network 100.

In the embodiment shown in FIG. 1, the development work log server 102 may be configured to store one or more work logs that contain details of a log or record of software work that has been retrieved to create one or more digital requirement documents. In the embodiment shown in FIG. 1, the QA defect log server 104 may be configured to create testing artifacts directly from logged defects against a releasing asset. An artifact may be any element in a software development project. For example, an artifact may include documentation, test plans, images, data files or executable modules, or a distortion in an image or sound caused by a limitation or malfunction in the hardware or software.

A testing artifact may be a file created during testing. For example, a document that is tested during a software development cycle may be regarded as a testing artifact. As an another example, a log file may be an artifact. As yet another example, if temporary files are created during software development tests, then those temporary files may be regarded as artifacts. For example, if images are downloaded during testing, then those images may be regarded as artifacts. Artifacts typically include, but are not limited to, documents or files. For example, artifacts may comprise design documents, data models, workflow diagrams, test matrices and plans, setup scripts, or the like.

In the embodiment shown in FIG. 1, the software asset inventory server 106 may be configured to store software artifacts that may be tagged individually against asset metadata for uniqueness and granularity. An asset may represent information technology ("IT") software, and asset metadata may represent attributes associated with the asset. For example, Microsoft® MS-Online may be considered an asset, and its attributes such as classification, app information, ownership, legal, risk, or capacity may be considered its metadata. In the embodiment shown in FIG. 1, the UI server 108 may be configured to allow one or more users to access the UI server 108 to interact with one or more applications. The UI services server 110 may be configured to communicate with the UI server 108 and to provide reports as well as authorization and approval of UIs to the UI server 108. In an embodiment, data may be served asynchronously between the UI server 108 and the UI services server 110. In addition or as an alternative, the UI services server 110 may allow one or more users to interact with one or more applications through the UI services server 110. Although FIG. 1 depicts an embodiment in which the UI server 108 and the UI services server 110 are implemented in two separate computers, the UI server 108 and the UI services server 110 may be integrated into a single computer in an alternate embodiment.

In the embodiment shown in FIG. 1, the business rules server 112 may be configured to communicate with the UI services server 110, the development work log server 102, the QA defect log server 104, and the software asset inventory server 106. The SDA database server 114 may be configured to store de-normalized artifacts in relational tables along with their versions, states, or approval details. In an embodiment, the SDA database server 114 may be configured as an SDA repository that stores the relational tables that relate the de-normalized artifacts with respective versions, states, or approval details. In an embodiment, the software release database server 116 may be configured to store and release captured software details to synchronize with the SDA depository in the SDA database server 114. In an embodiment, the network storage 122 may be configured to store approved artifacts that have been audited, to back up all audited and approved artifacts, and to make those artifacts available on network share.

In the example shown in FIG. 1, two terminals including the operations team terminal 118 and the technical team terminal 120 are depicted, although one or more additional terminals may be provided in the computer network 100. The operations team terminal 118 may be configured to communicate with the UI server 108 while the technical team terminal 120 may be configured to communicate with both the UI server 108 and the UI services server 110. In an alternate embodiment, a single physical terminal may be configured to allow access by both the operations team and the technical team. For example, an operations team employee may access the UI server 108 by using one set of credentials, such as a combination of a user identification and a password, or the like, whereas a technical team employee may access the UI server 108 and the UI services server 110 by using another set of credentials, such as a combination of a user identification and a password, or the like.

Figure 2:
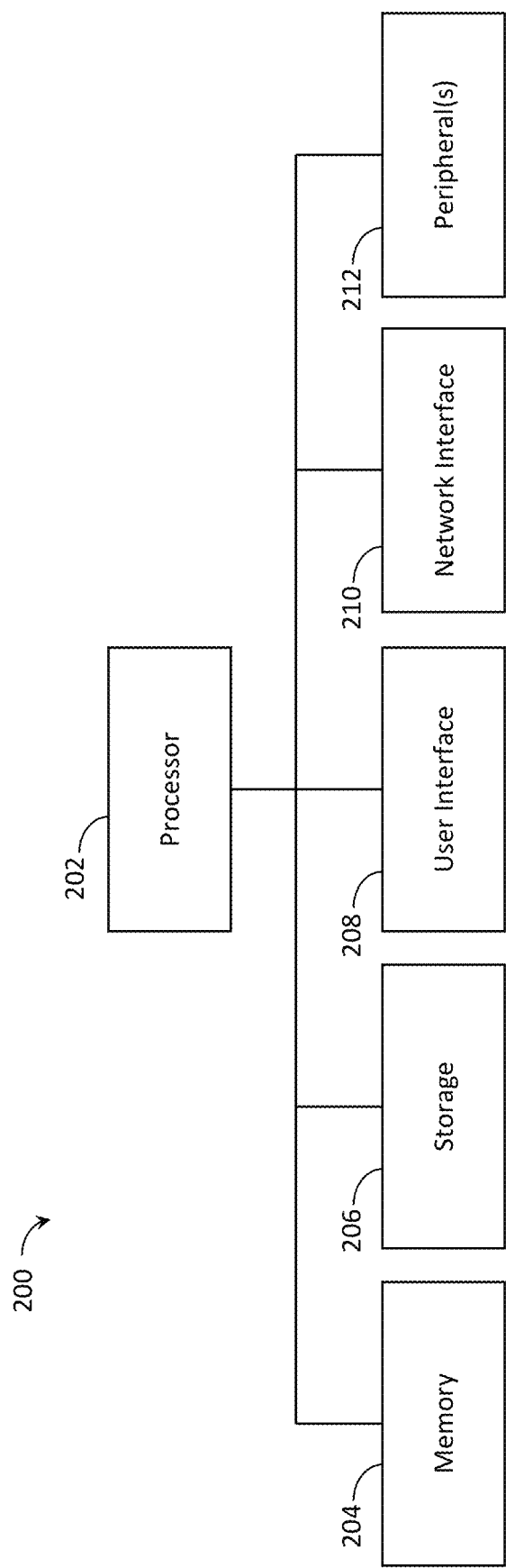
FIG. 2 illustrates an example of a block diagram of a computer system according to an exemplary embodiment of the invention.

An embodiment of a computer system 200 is shown in FIG. 2. The computer system 200 may include a processor 202 which is configured to communicate with a memory 204, a storage 206, a user interface 208, a network interface 210, and one or more peripherals 212. The memory 204 may include a random access memory (RAM), a read-only memory (ROM), a combination of RAM and ROM, or the like. The storage 206 may include a hard disk drive, a tape drive, a compact disc read-only memory (CD-ROM), a flash drive, or the like. The user interface 208 may include a keyboard, a keypad, a display screen, a touchscreen, or the like. The network interface 210 may include a communication interface for the Internet, an intranet, a Local Area Network (LAN), a Wide Area Network (WAN), an Ethernet, a WiFi network, a cellular phone network such as 2G, 3G, 4G or 5G network, a Bluetooth network, a satellite communications network, a data bus, or other network, or the like. The peripherals 212 may include a printer, a scanner, or any other external device. In some embodiments, the processor 202 may include one or more central processing units (CPUs), graphic processing units (GPUs), and/or field programmable gate arrays (FPGAs). The computer system 200 may be implemented in various physical and functional configurations for creating and validating SDLC digital artifacts within the scope of the disclosure.

Figure 3:
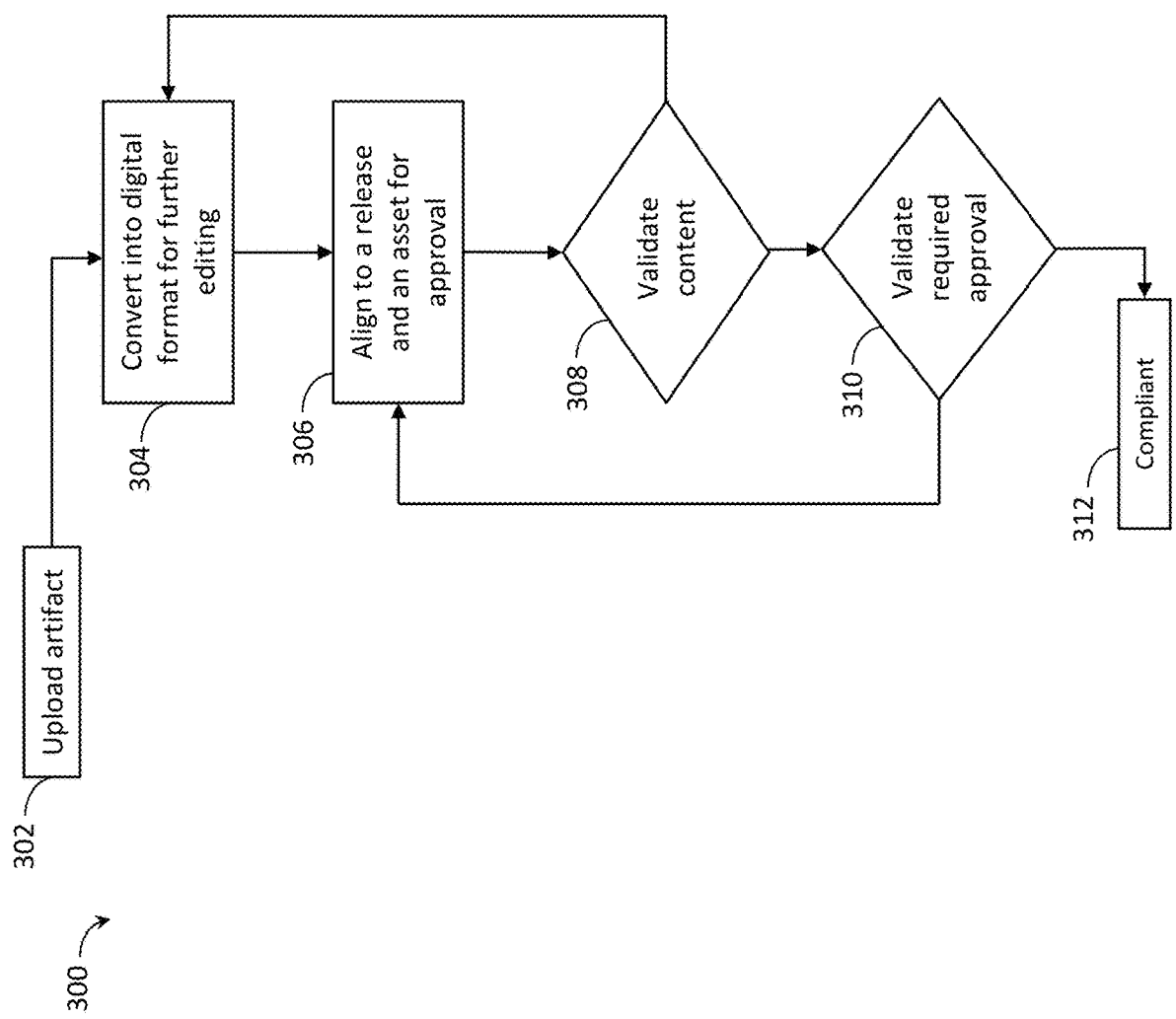
FIG. 3 illustrates an example of a process flow for validating SDLC artifacts according to an exemplary embodiment of the invention.

FIG. 3 illustrates an example of a process flow 300 for validating SDLC artifacts according to an exemplary embodiment of the invention. In the embodiment shown in FIG. 3, an artifact is uploaded into the computer system in step 302. The artifact may or may not be a standard artifact. For example, the artifact that is uploaded in step 302 may be a non-standard compliant artifact, such as a document, file, or template that was custom-created by an operations team member who has not followed standard protocols. In step 304, the uploaded artifact may be converted into a digital format by the computer system for further editing by the user. In step 306, the converted artifact may be aligned to a release and an asset for approval. A release may indicate the date and time when a new version of software is released.

In step 308, the content of the converted artifact may be validated by the computer system. If the computer system determines that the content of the converted artifact is invalid in step 308, then the converted artifact is returned to the user for further editing in step 304. On the other hand, if the computer system determines that the content of the converted artifact is valid in step 308, then the required approval for the converted artifact may be validated by the computer system in step 310. If the computer system determines that the required approval is invalid in step 310, then the converted artifact is returned for further alignment to a release or an asset for approval in step 306. On the other hand, if the computer system determines that the required approval is valid in step 310, then the converted artifact is deemed to be standard-compliant in step 312.

Figure 4:
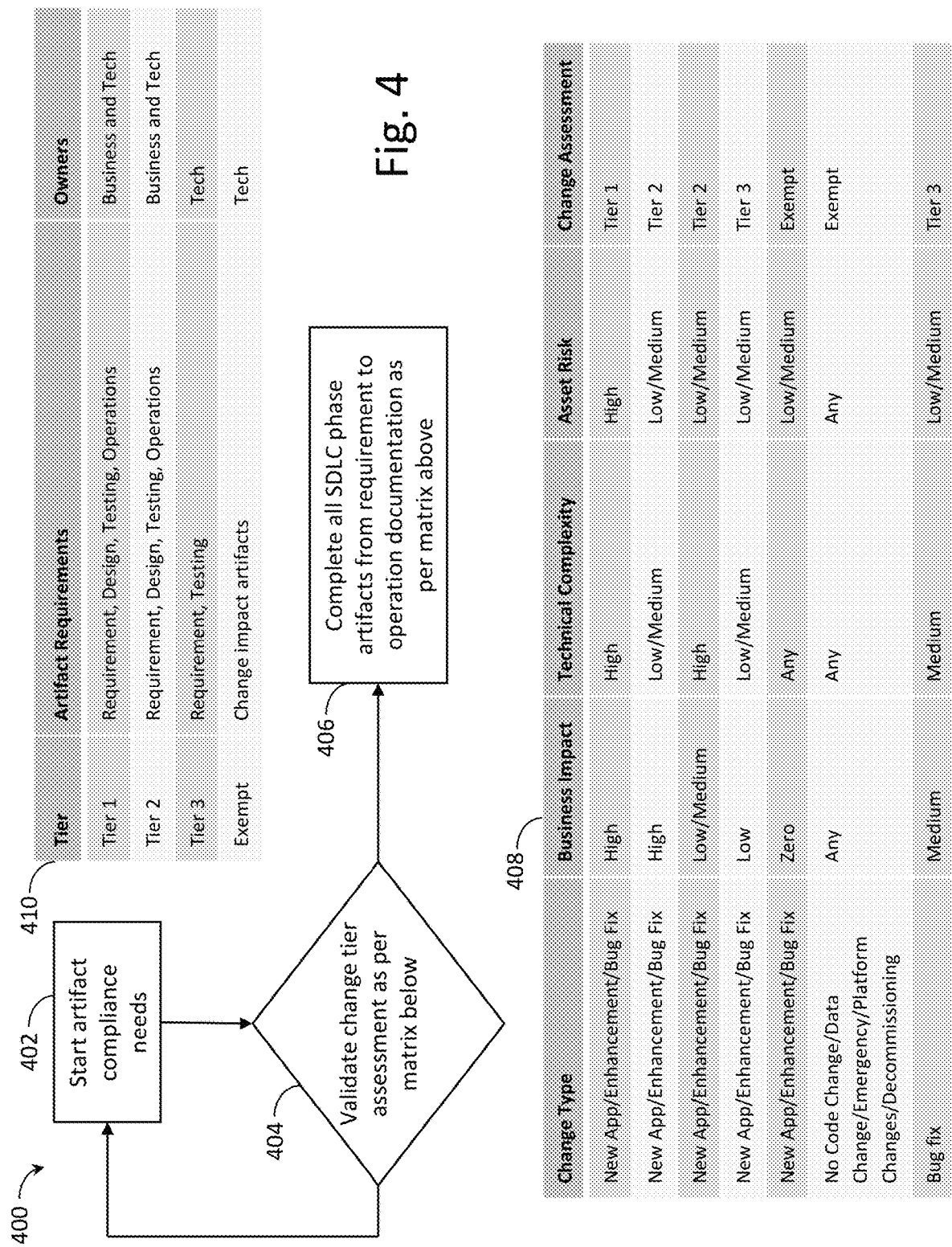
FIG. 4 illustrates an example of a process flow for validating SDLC artifacts with a multi-tier approval process according to an exemplary embodiment of the invention.

FIG. 4 illustrates an example of a process flow 400 for validating SDLC artifacts with a multi-tier approval process according to an exemplary embodiment of the invention. In the embodiment shown in FIG. 4, the computer system starts the artifact compliance requirement process in step 402. The artifact compliance requirements may be predetermined and stored in the computer system. In some embodiments, the artifact compliance requirements may be created or modified by information technology (IT) personnel with the proper authority. After the artifact compliance requirement process is started by the computer system in step 402, the computer system may validate change assessments to artifacts in step 404. In an embodiment, the change assessments may be categorized in multiple tiers. If the change assessments are not validated in step 404, then the computer system may start a new artifact compliance requirement process in step 402. If the change assessments are validated in step 404, then the computer system completes all SDLC artifacts from the requirement phase to operational documentation in step 406.

As an illustrative example, change assessments may be categorized in tiers as shown by a matrix in block 408. In this example, a Tier 1 change assessment indicates that the proposed change to the artifact requires a high level of approval. In contrast, a Tier 3 change assessment indicates that the proposed change to the artifact requires a low level of approval. A Tier 2 change assessment indicates that the proposed change to the artifact requires a medium level of approval. In some instances, proposed changes to artifacts may be exempt from the approval process due to low levels of business, technical or asset risks. An asset risk may be a measure of criticality of an asset to a business. Software that is critical to keep a business running in real time may be considered a high-risk asset. For example, in an equity trading environment, a trading platform may be considered a high-risk asset.

As shown in block 408, if the proposed change to the artifact is due to a new application, enhancement or bug fix, and the business impact, technical complexity and asset risk are high, then the change assessment would be Tier 1. If the proposed change to the artifact is due to a new application, enhancement or bug fix, and the business impact is high while the technical complexity and asset risk are low or medium, then the change assessment would be Tier 2. Likewise, if the proposed change to the artifact is due to a new application, enhancement or bug fix, and the business impact and asset risk are low or medium while the technical complexity is high, then the change assessment would be Tier 2. If the proposed change to the artifact is due to a new application, enhancement or bug fix, and the business impact is low while the technical complexity and asset risk are low or medium, then the change assessment would be Tier 3.

As shown in block 408, if the proposed change to the artifact is due to a new application, enhancement or bug fix, and the business impact is zero while the asset risk is low or medium, then the change assessment would be "Exempt," which means that no approval is required for the change regardless of technical complexity. In this example, a relatively great amount of weight is given to business impact and some weight is given to asset risk, whereas technical complexity is given no weight in the change assessment, based on the assumption that the technical team is able to resolve any technical issues associated with artifact changes due to a new application, enhancement or bug fix. Alternatively, technical complexity may be given weight along with business impact and asset risk to determine which tier of approval would be required for the proposed change to the artifact.

As shown in block 408, some types of proposed changes to artifacts other than changes due to a new application, enhancement or bug fix may only require a low tier of approval or be exempt from the approval process. For example, if a proposed change to an artifact is not due to a code change but is due to a data change, an emergency, a platform change, or decommissioning of software, then the proposed change to the artifact may be exempt from the approval process, regardless of the levels of business impact, technical complexity or asset risk. If a proposed change to an artifact is only due to a bug fix, and the business impact and technical complexity are medium while the asset risk is low or medium, then the change assessment would be Tier 3, which means that the proposed change would require a low level of approval. Various modifications may be made to the matrix as shown in block 408 of FIG. 4 within the scope of the disclosure. For example, one of the criteria, i.e., business impact, technical complexity and asset risk, may be weighted more heavily than the other two. As another example, one or more additional criteria may be added to the matrix as shown in block 408 of FIG. 4 to determine the tier level of change assessment, that is, to determine what level of approval is required for the proposed change to the artifact.

In the embodiment shown in FIG. 4, after the change tier assessment is validated in step 404, all SDLC artifacts from the requirement phase to operational documentation are completed in step 406. An example of a matrix for completing artifact changes is illustrated in block 410. As described above, in the example illustrated in FIG. 4, three tiers of approval are implemented depending on the type of proposed change to the artifact, the business impact, the technical complexity, and the asset risk, with Tier 1 requiring the highest level of approval and Tier 3 requiring the lowest level of approval. Some types of changes may be exempt from the approval process.

In the matrix shown in block 410 of FIG. 4, a Tier 1 approval process means that the proposed change to the artifact entails validations of requirements, design, testing and operations, and must be implemented by the appropriate business operations and technical teams. Likewise, a Tier 2 approval process means that the proposed change to the artifact entails validations of requirements, design, testing and operations, and must be implemented by the appropriate business operations and technical teams, albeit with a less stringent requirement than Tier 1. A Tier 3 approval process means that the proposed change to the artifact entails validation of requirements and testing, and needs to be implemented only by the technical team. A proposed change to an artifact may be exempt from the approval process if it merely impacts the artifact itself, and the technical team may implement the change without going through an approval process. Variations of approval and implementation processes different from the example shown in FIG. 4 and described above may be contemplated within the scope of the disclosure.

Figure 5:
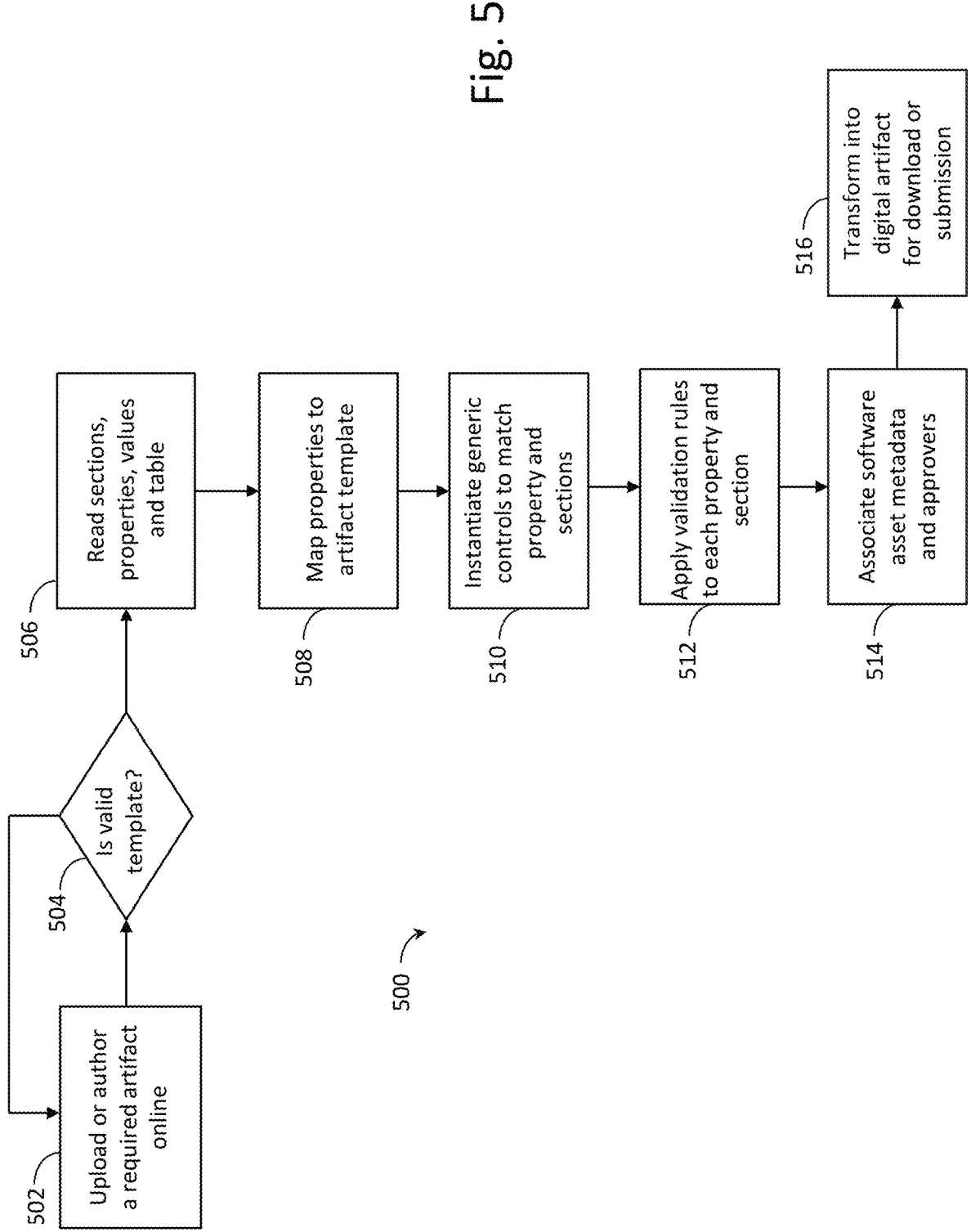
FIG. 5 illustrates an example of a process flow for validating, mapping and transforming SDLC artifacts according to an exemplary embodiment of the invention.

FIG. 5 illustrates an example of a process flow 500 for validating, mapping and transforming SDLC artifacts according to an exemplary embodiment of the invention. In the embodiment shown in FIG. 5, an artifact may be authored online by a user or uploaded into the computer system in step 502. The artifact may or may not be a standard-compliant artifact. The computer system then determines whether the artifact is a valid template in step 504. If a determination is made that the artifact is not a valid template in step 504, then the computer system would allow the user to upload or author another artifact online in step 502. If a determination is made that the artifact is a valid template in step 504, then the computer system reads sections, properties, values or tables in step 506. An artifact may include a predefined structure, which may include sections, such as overview sections or detailed sections, tables, such as version history or glossary, properties, such as paragraphs, images, texts, choices, rich texts, and values of the contents held within the properties.

After the sections, properties, values and tables are read in step 506, the computer system may map the properties to the artifact template in step 508. In an embodiment, the computer system may instantiate generic controls to match the properties and the sections in step 510. For example, each property may be mapped to a section, and each section may be unique to an artifact. The relationships that define the mappings of the properties and sections may be stored in the computer system. For example, the computer system may store the relationships that define mappings of values to properties, properties to sections, and sections to artifacts, thus giving each value a unique identification. Rules of validation may be implemented at each level of mapping such that when an artifact is submitted, the accuracy, order, completeness and requirement are validated according to such rules to ensure the quality of an artifact is not compromised. The computer system then applies validation rules to each property and section in step 512. After the validation rules are applied to each property and section in step 512, the computer system may associate software asset metadata and approvers in step 514. Depending on the tier of approval required for changing the artifact, the approvers may include the appropriate business operations team, the technical team, or both, as described above with respect to FIG. 4. After the proposed change to the artifact is approved, the computer system may transform the artifact into a digital artifact for download or submission in step 516.

Figure 6:
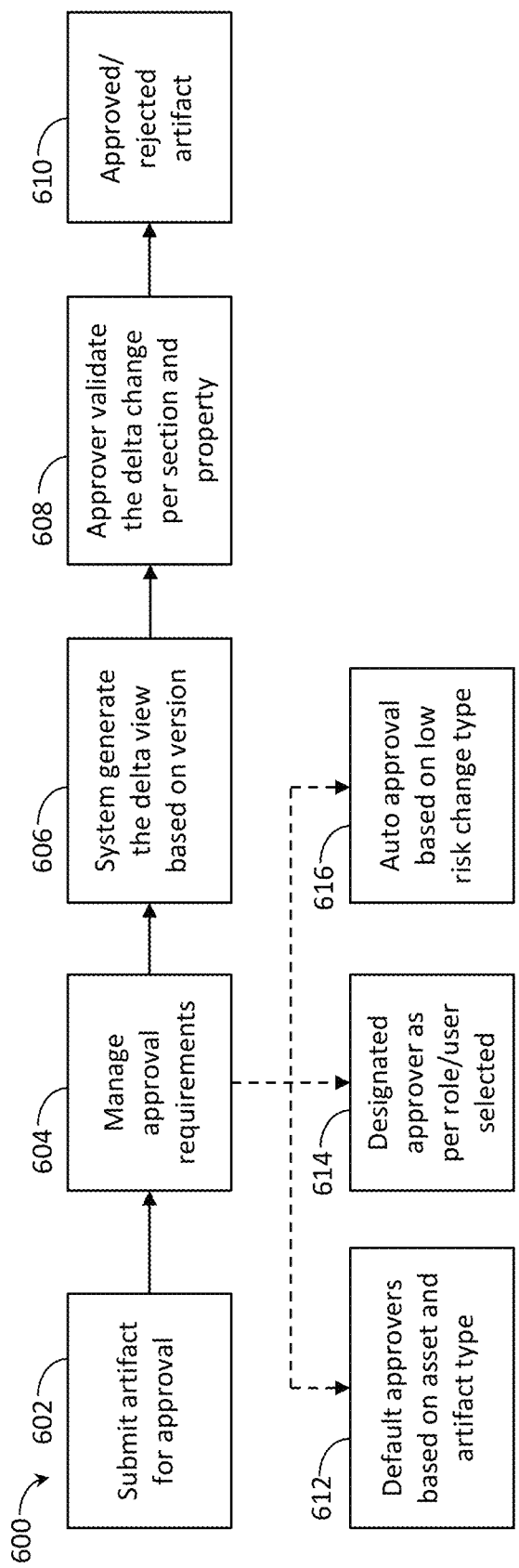
FIG. 6 illustrates an example of a process flow for approval of SDLC artifacts according to an exemplary embodiment of the invention.

FIG. 6 illustrates an example of a process flow 600 for approval of SDLC artifacts according to an exemplary embodiment of the invention. In the embodiment shown in FIG. 6, an artifact is submitted for approval in step 602. The artifact may or may not be a standard-compliant artifact. In step 604, the computer system may manage the approval requirements for the artifact. In step 606, the computer system may generate a delta view illustrating the differences between the previous version and the updated version of the software. In step 608, the computer system may provide the delta view or change for each section or property based on the differences between the previous version and the updated version of the software, and allow one or more approvers to validate the change. The approvers may include the appropriate business operations team, the technical team, or both. The approvers may approve or reject the artifact, and the approval or rejection may be received by the computer system in step 610.

The computer system may manage the approval requirements in step 604 in various manners. For example, the management of approval requirements may include designating default approvers based on the asset and artifact type in step 612. In addition or as an alternative, the management of approval requirements may include designating one or more specific approvers based on the role or user selected in step 614. Moreover, in addition or as another alternative, the management of approval requirements may include automatic approval of the artifact based on the change type that is deemed to be low risk in step 616.

Those skilled in the art will appreciate that the diagrams discussed above are merely examples of a system for creating and validating SDLC artifacts and are not intended to be limiting. Other types and configurations of networks, servers, databases and personal computing devices (e.g., desktop computers, tablet computers, mobile computing devices, smart phones, etc.) may be used with exemplary embodiments of the invention.

Although the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Although examples of servers, databases, and personal computing devices have been described above, exemplary embodiments of the invention may utilize other types of devices whereby a user may interact with a network that transmits and delivers data and information used by the various systems and methods described herein. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art.

In some embodiments, the computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device.

The servers, databases, and personal computing devices described above may include at least one accelerated processing unit, such as a GPU or FPGA, and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software stored in the memory (e.g., non-transitory computer readable medium containing program code instructions executed by the processor) for executing the methods described herein.

Any suitable programming language may be used in accordance with the various embodiments of the invention. For example, the programming language used may include assembly language, Ada, APL, Basic, C, C++, dBase, Forth, HTML, Android, iOS, .NET, Python, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

The software, hardware and services described herein may be provided utilizing one or more cloud service models, such as Software-as-a-Service (SaaS), Platform-as-a-Service (PaaS), Infrastructure-as-a-Service (IaaS), and Logging as a Service (LaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor.

Although the embodiments of the invention have been described herein in the context of a particular implementation in a particular environment for a particular purpose, those skilled in the art will recognize that its usefulness is not limited thereto and that the embodiments of the invention can be beneficially implemented in other related environments for similar purposes.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents. The specification and drawings are accordingly to be regarded as an illustrative rather than restrictive sense.

What is claimed is:

1. A computer-implemented system, comprising:
a memory; and
a processor coupled to the memory, the processor configured to:
receive a software development lifecycle (SDLC) artifact that includes a template created on a server-based user interface (UI), without coding, via uploading of a document to the UI and/or using the UI to edit a representation of a previously uploaded document, the template's contents comprising one or more sections, each section comprising one or more properties, wherein the UI is configured to represent one or more requirements of the SDLC artifact based upon one or more rules indicating one or more tiers of approval, a tier of approval needed for the SDLC artifact being selected based at least in part on both an estimated technical complexity and a level of asset risk associated with a software change represented by the SDLC artifact;
determine whether the template of the SDLC artifact is valid;
map the one or more sections and the one or more properties to the template in response to a determination that the template of the SDLC artifact is valid;
associate software asset metadata and one or more approvers of the SDLC artifact based upon the selected tier of approval; and
transform the SDLC artifact into a standard-compliant SDLC artifact.

2. The computer-implemented system of claim 1, wherein the processor is further configured to instantiate one or more controls to match the one or more properties to one or more sections.

3. The computer-implemented system of claim 2, wherein the processor is further configured to apply one or more validation rules to each of the one or more properties and each of the one or more sections.

4. The computer-implemented system of claim 1, wherein the processor is further configured to convert the SDLC artifact into a format that is editable to create an edited SDLC artifact.

5. The computer-implemented system of claim 4, wherein the processor is further configured to align the edited SDLC artifact to a release for approval.

6. The computer-implemented system of claim 5, wherein the processor is further configured to validate a content of the edited SDLC artifact.

7. The computer-implemented system of claim 6, wherein the content of the edited SDLC artifact is validated by validating the edited SDLC artifact in a plurality of tiers.

8. The computer-implemented system of claim 1, wherein the processor is further configured to receive a second SDLC artifact in response to a determination that the template of the SDLC artifact is not valid.

9. The computer-implemented system of claim 1, wherein the processor is further configured to convert the SDLC artifact into an editable format in response to a determination that the template of the SDLC artifact is not valid.

10. The computer-implemented system of claim 1, wherein the processor is further configured to transmit the standard-compliant SDLC artifact to one or more terminals.

11. A computer-implemented method, comprising:
receiving a software development lifecycle (SDLC) artifact that includes a template created on a server-based user interface (UI), without coding, via uploading of a document to the UI and/or using the UI to edit a representation of a previously uploaded document, the template's contents comprising one or more sections, each section comprising one or more properties, wherein the UI is configured to represent one or more requirements of the SDLC artifact based upon one or more rules indicating one or more tiers of approval, a tier of approval needed for the SDLC artifact being selected based at least in part on both an estimated technical complexity and a level of asset risk associated with a software change represented by the SDLC artifact;
determining whether the template of the SDLC artifact is valid;
mapping the one or more sections and the one or more properties to the template in response to a determination that the template of the SDLC artifact is valid;

associating software asset metadata and one or more approvers of the SDLC artifact based upon the selected tier of approval; and transforming the SDLC artifact into a standard-compliant SDLC artifact.

12. The computer-implemented method of claim 11, further comprising:

instantiating one or more controls to match the one or more properties to one or more sections.

13. The computer-implemented method of claim 12, further comprising:

applying one or more validation rules to each of the one or more properties and each of the one or more sections.

14. The computer-implemented method of claim 11, further comprising:

converting the SDLC artifact into a format that is editable to create an edited SDLC artifact.

15. The computer-implemented method of claim 14, further comprising:

aligning the edited SDLC artifact to a release for approval.

16. The computer-implemented method of claim 15, further comprising:

validating a content of the edited SDLC artifact.

17. The computer-implemented method of claim 16, wherein the step of validating the content of the edited SDLC artifact comprises validating the edited SDLC artifact in a plurality of tiers.

18. The computer-implemented method of claim 17, further comprising:

receiving a second SDLC artifact in response to a determination that the template of the SDLC artifact is not valid.

19. The computer-implemented method of claim 11, further comprising:

converting the SDLC artifact into an editable format in response to a determination that the template of the SDLC artifact is not valid.

20. The computer-implemented method of claim 11, further comprising:

transmitting the standard-compliant SDLC artifact to one or more terminals.

* * * * *